METHOD AND APPARATUS FOR RECORDING AND REPRODUCING ELECTRICAL SIGNALS

Filed June 26, 1961

INVENTOR.

Rolf Möller, Werner Treher

BY

Michael S. Striker

Attorney

United States Patent Office 3,099,710

Patented July 30, 1963

3,099,710

METHOD AND APPARATUS FOR RECORDING AND REPRODUCING ELECTRICAL SIGNALS

Rolf Möller and Werner Tretner, Darmstadt, Germany, assignors to Fernseh G.m.b.H., Darmstadt, Germany Filed June 26, 1961, Ser. No. 119,629
Claims priority, application Germany June 25, 1960
9 Claims. (Cl. 178—6.6)

Figure 1:
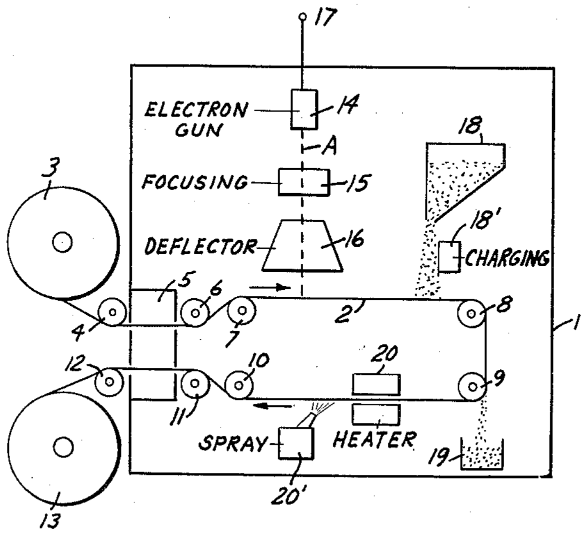

The present invention concerns a method and apparatus for recording and reproducing, respectively, electrical signals. The invention involves the use of a record carrier of insulating material of a type thereof which may be selected to suit the particular purpose. However, the form of the record carrier is of little importance for the invention, it may be e.g. a tape or a disc.

It is a main object of this invention to provide for a method of recording and reproducing, respectively, electrical signals in such a manner that the record is a permanent one which cannot be easily destroyed by outside influences as is the case for instance when magnetic records are influenced magnetically.

It is another object of the present invention to provide for a method of recording electrical signals in such a manner that the record of the type just mentioned can be converted even after protracted storage by a simple scanning operation directly into electrical signals that may be suitable for instance for being handled by standard television studio equipment.

It is another object of this invention to provide for a method of reproducing electrical signals from records of the type set forth in a simple and efficient manner.

It is still another object of the invention to provide for apparatus for recording electrical signals in a manner corresponding to the method according to the objects of this invention.

It is a further object of this invention to provide for an apparatus for reproducing electrical signals from records of the type set forth.

With above objects in view a method of recording and subsequently reproducing electrical signals comprises, according to the invention, the steps of: producing on a record carrier member of insulating material a sequential pattern of surface elements carrying an electrical charge and representing by their relative arrangement an electrical signal to be recorded; applying to said record carrier member a finely divided material differing from said insulating material by its capacity of responding to energy radiation impinging thereon by emitting corresponding amounts of energy, so that said finely divided material is selectively held by attraction on said surface elements carrying an electric charge; removing from said record carrier member that portion of said finely divided material which is not held thereon at said surface elements; permanently attaching to said record carrier member said finely divided material held thereon at said surface elements; scanning for reproduction said record carrier member by sequentially exposing said finely divided material attached to said surface elements to a beam of energy radiation; and deriving an output signal from energy pulses emitted by said pattern of surface elements to which said finely divided material is attached, in response to said beam of energy radiation impinging thereon.

In another aspect of this invention a method of recording electrical signals comprises the steps of: producing on a record carrier member of insulating material a sequential pattern of surface elements carrying an electrical charge and representing by their relative arrangement an electrical signal to be recorded; applying to said record carrier member a finely divided material differing from said insulating material by its capacity of responding to energy radiation impinging thereon by emitting corresponding amounts of energy, so that said finely divided material is selectively held by attraction on said surface elements carrying an electric charge; removing from said record carrier member that portion of said finely divided material which is not held thereon at said surface elements; and permanently attaching to said record carrier member said finely divided material held thereon at said surface elements.

In still another aspect of this invention a method of reproducing electrical signals from a record carrier comprising a sequential pattern of surface elements carrying, respectively, deposits of material differing from the carrier by its capacity of responding to energy radiation impinging thereon by emitting corresponding amounts of energy, the relative arrangement of said surface elements representing a recorded electrical signal, comprises the steps of: scanning for reproduction the record carrier member by sequentially exposing said material carried on said surface elements to a beam of energy radiation; and deriving an output signal from energy pulses emitted by said pattern of surface elements carrying said material, in response to said beam of energy radiation impinging thereon.

In still another aspect of the invention an apparatus for recording electrical signals on a record carrier comprises, according to the invention, in combination, an evacuable chamber; means for producing in said chamber a beam of charged particles having an intensity modulated by the signal to be recorded; means for moving the record carrier transversely of the direction of said beam for causing the latter to impinge thereon and to produce thereon a sequential pattern of surface elements carrying an electrical charge, said pattern representing the signal to be recorded; means for applying to the record carrier finely divided material so as to be held selectively by attraction on said surface elements carrying an electrical charge, said finely divided material differing from that of the record carrier by a difference in capacity of responding to energy radiation impinging thereon by emitting corresponding amounts of energy; means for removing from the recording carrier such amounts of said finely divided material which are not held thereon at said surface elements; and means for permanently attaching to the record carrier those amounts of said finely divided material which are held thereon at said surface elements.

In still another aspect of the invention an apparatus for reproducing electrical signals recorded on a record carrier comprising a sequential pattern of surface elements carrying, respectively, deposits of material differing from the record carrier by a difference in capacity of responding to energy radiation impinging thereon by emitting corresponding amounts of energy, the relative arrangement of said surface elements representing a recorded electrical signal, comprises, according to the invention, in combination, means for producing a beam of energy radiation; means for moving the record carrier transversely of said beam for causing the latter to impinge thereon and for causing emission of energy from those portions of the record carrier which have the capacity of responding in this manner to said beam impinging thereon; and pickup means for receiving said emission of energy and for delivering an output signal corresponding to the recorded signal.

Figure 2:
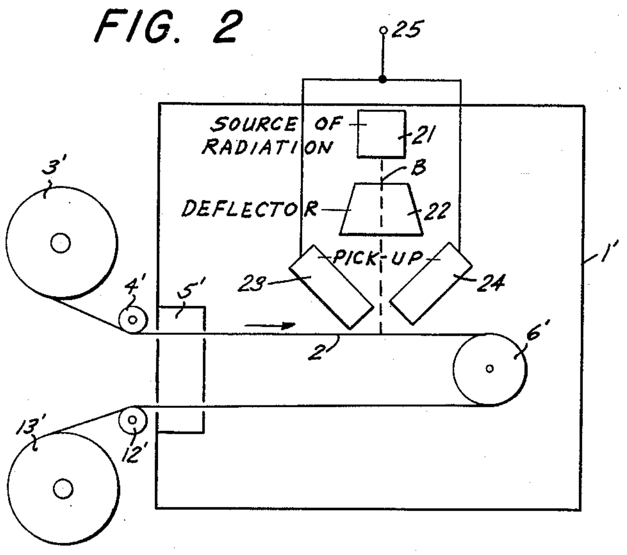

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

FIG. 1 is a schematic diagram illustrating one embodiment of an apparatus according to the invention for recording electrical signals upon an elongated record carrier member; and FIG. 2 is a schematic diagram illustrating one embodiment of an apparatus according to the invention for reproducing signals recorded in accordance with the invention on an elongated record carrier member.

It is believed that the invention will be best understood if first the apparatus for recording according to FIG. 1 and the apparatus for reproducing according to FIG. 2 are described because certain elements of the methods involved are automatically explained thereby. Further details and modifications of these methods will be described further below.

It is to be understood that the embodiments according to FIGS. 1 and 2 are specifically provided for use in connection with a record carrier tape. However, it will be seen that those components and elements of these apparatus which are characteristic of the invention would be the same also if the record carrier member were a disc.

Referring now to FIG. 1, the main operative components of the recording apparatus are arranged within an evacuable enclosure or chamber 1. A record carrier member 2 of insulating material, conveniently a suitable synthetic foil tape, e.g. a polymeric material which is thermoplastic, is supplied from a storage spool 3 and is guided over a guide roller 4 and through a vacuum lock of conventional type into the chamber 1 which is to be assumed to be evacuated. The record carrier tape 2 travels over a plurality of guide rollers or pulleys 6–11 in the manner illustrated in FIG. 1, and any one of these rollers or pulleys may be a driving pulley for moving the tape 2 in the direction of the arrows at a predetermined speed. After passing the guide pulley 11 the tape 2 passes again through the vacuum lock 5 and reaches the take-up spool 13 after passing over a final guide pulley 12. Of course, the movement of the tape 2 may also be provided by applying driving power to the spool 13.

The primary means for recording electrical signals on the record tape 2 comprise an electron gun 14 which is so mounted within the chamber 1 that its beam A of charged particles or electrons is directed toward the tape 2 and is traversed by the latter during its movement. The beam A may be focused to a comparatively small spot on the surface of the tape 2 by means of conventional electrostatic means represented in FIG. 1 by a single electrode 15. The signals to be recorded are applied to an input terminal 17 and thereby to a conventional modulator electrode of the electron gun 14 so that the modulated intensity of the beam A represents the signal to be recorded. It is advisable to provide also conventional electrostatic deflector means 16 whereby the beam A is periodically deflected across the width of the tape 2.

The modulated electron beam A will produce on the moving record tape 2 a sequential pattern of surface elements (in the case of the application of beam deflection these surface elements will be of the nature of transverse lines on the tape) which carry an electrical charge of predetermined polarity and in accordance with the modulated intensity of the beam A. The sequence and relative arrangement of the charged surface elements represents the electrical signal to be recorded and applied to the terminal 17.

Above and along the path of the record carrier tape 2 a dusting device 18 is mounted as indicated in FIG. 1 for holding a supply of very finely divided material, e.g. a phosphor powder having a grain size of for example 1$\mu$ to 3$\mu$, and including means, not shown, for distributing such powder uniformly across the width of the tape 2 and along the surface of the latter while the tape 2 passes beneath the device 18.

It will be understood that the powder deposited on the surface of the record carrier tape 2 will be held by attraction on those surface elements which have been charged by the impinging electron beam A. Since the material of the tape 2 is of insulating or non-conductive character, the charges are not dissipated but locally concentrated where they have been applied so that in the intervals between the charged surface elements the powder will not adhere to the tape 2.

If desired, an auxiliary device 18' may be provided between the dusting device 18 and the tape 2 for the purpose of charging the powder with an electric potential opposite to that of the charges produced on the record tape 2 by the electron beam A. Hereby the effect described above is improved. It should be noted that the device 18 may be of any known kind and is not necessarily of the hopper type as illustrated. For instance, it may comprise a rotary brush which throws powder particles taken from a supply thereof in the direction toward the tape.

After the powder has been applied to the record tape 2 the latter passes through means by which the excess powder, namely that powder which is not held by attraction on the charged surface elements of the tape, is removed. In the embodiment according to FIG. 1 these means comprise simply the guide rollers 8 and 9 which cause the tape 2 to reverse its direction of movement so that those particles of dust which are not held by the charged surface elements are capable of dropping off into a collecting container 19. Of course, for the same purpose other means for removing the loose powder from the tape 2 may be used as well.

After this step the record carrier tape 2 carries a record of the electrical signal applied to the terminal 17 in the form of a sequential pattern of the powder deposited on, and held by, the charged surface elements on the tape. All that remains is to premanently attach the powder to the record carrier tape 2. This can be done in various ways.

If the material of the record tape 2 is thermoplastic the permanent attachment of the powder to the tape can be easily achieved by briefly heating the record tape 2 by means of a conventional heating device, e.g. an electric heater 20 so that the powder which was so far only held by electrostatic attraction is now fused with the tape. In case, for any reason, it should be undesirable to heat the entire tape on that length thereof which passes through the heater 20, or if the tape itself should not be made of thermoplastic material, then a tape may be used which carries a thin layer of heat-activatable adhesive material so that during the passage of the tape 2 through the heating device 20 only the adhesive is activated and the powder on the above mentioned surface elements is fused with the adhesive and thereby permanently attached to the tape 2. In certain cases a type of tape may be used which makes it undesirable to apply any heat. In such a case the permanent attachment of the powder to the tape 2 may be conveniently accomplished by providing a spraying device 20' adjacent to the tape 2 as shown in FIG. 1, for the purpose of spraying an adhesive onto the tape and thereby attaching the powder to the above mentioned surface elements of the tape 2. The adhesive may be for instance a dissolved, liquefied or heated synthetic resin.

After this step the recording operation is complete and the permanent record is wound on the take-up spool 13.

It will be readily understood that if instead of a record carrier tape 2 a record carrier disc is used in the recording apparatus according to FIG. 1, the components 3–13 will be replaced by conventional means for moving or rotating a disc in such a manner that the beam A impinges on a suitable track provided on the disc. The application of powder can be carried out in the manner generally explained above to that portion of the track which has been provided with the above mentioned sequential pattern of surface elements carrying the charges produced by the impinging beam A. The excess powder may be blown away or otherwise removed. The heating may be applied to the respective track section also with conventional means, and similarly, if desired, a spray of adhesive may be applied to such track portion by means of a suitably located spray device 20'.

It should be understood that in one embodiment of the recording method according to the invention the finely divided material mentioned above may consist of a finely powdered short-afterglow phosphor, such as for example calcium aluminosilicate or zinc oxide. Also organic fluorescent materials in the form of powder may be employed. A further modification of the recording method consists in using e.g. powdered aluminum or magnesium oxide, i.e. using a powder which has a coefficient of secondary emission which differs from that of the material of the record carrier. Materials which furnish a secondary emission when impinged upon by an electron beam are well known to the art. Still another alternative form of the recording method according to the invention consists in using a record carrier member which is in itself fluorescent, or may be only impregnated with fluorescent material or having only a surface layer thereof. In this case the finely divided material or powder applied to the record carrier has to consist of light-absorbing material which is opaque to the luminescence which would be produced in the fluorescent record carrier material when the latter is excited by a beam of light or by a beam of electrons impinging thereon.

Referring now to FIG. 2 which illustrate diagrammatically a signal reproducing apparatus according to the invention, an enclosure or chamber 1' is illustrated although an evacuable chamber of this type is not required in all forms of this reproduction apparatus. Referring again to the case where the record carrier member is a tape 2, FIG. 2 shows a stock spool 3' from which the tape 2 is supplied and guided over a first guide roller 4' and through a conventional vacuum lock 5' (provided that the chamber 1' is to be evacuated) and over a large guide roller 6' where its direction of movement is reversed so that it returns again through the vacuum lock 5' (provided that the latter is required) and over a guide roller 12' to a take-up spool 13'.

Mounted within the chamber 1' is a source of radiation 21 which may be an electron gun of conventional type emitting a beam of electrons or charged particles B toward the record tape 2 as shown so that the latter traverses the beam B. If in this manner an electron beam B is used, then the chamber 1' must be evacuated and the vacuum lock 5' must be provided. Moreover, in this case conventional deflector means 22 may be provided for periodically deflecting the beam B in a direction transverse of the surface of the record tape 2.

The impingement of the beam B on the moving record tape 2, and more particularly on the sequential pattern of surface elements thereon which carry one or the other of the powder materials mentioned above, excites the latter or otherwise causes the latter to emit energy radiation in the form of pulses representing by their sequence the recorded signal. This energy radiation is picked up by pick-up means comprising e.g. a pair of devices 23, 24 connected in parallel with an output terminal 25 at which the picked up signal is available for being further utilized.

It will be understood that if the powder material carried by the record tape 2 in the form of a sequential pattern is the above mentioned phosphor material, the varying luminescence thereof excited by the impinging electron beam B will be received by the pick-up devices 23, 24 which in this case may be conventional photomultipliers, the outputs of which are furnished to the output terminal 25 as the desired output signal.

However, it will be understood that the same arrangement in general could be used as well if the source of radiation 21 is simply a source of light capable of projecting a precisely focused beam B of light on the phosphor material distributed as a sequential pattern on the tape 2. Also in this case the varying luminescence excited thereon by the impingement of the beam of light will be picked up by the photomultipliers 23, 25 and converted into an output signal available at the terminal 25. In this case where only a beam of light B is used, the enclosure 1' does not have to be evacuated, and, as a matter of fact, an enclosure may be dispensed with entirely, except for the purpose of shielding the scanning area against being illuminated by other sources.

On the other hand, if the sequential pattern on the record tape 2 comprises a powder deposited and held on the respective surface elements of the tape, and if that powder differs in secondary emission capability from the material of the tape, then, instead of photomultipliers, simple electron multipliers 23, 24 have to be used which respond to the secondary electrons emitted from the powder pattern on the tape 2.

Finally, if in accordance to the above described alternative form of the recording method of the invention, the record carrier itself in fluorescent, and the respective surface elements thereof have been covered with an opaque powder as mentioned above, then the scanning beam of light or of electrons, as described above, will excite those areas of the record carrier tape 2 which are not covered by the opaque powder and thus again produce the emission of light in accordance with the recorded signal, and this emission of light will again be picked up by the pick-up devices 23, 24 and converted into an output signal available at the output terminal 25.

While for convenience a pair of parallel connected pick-up devices 23, 24 have been shown, it will be understood that in certain cases only one such device in proper position will be sufficient.

As mentioned above with respect to FIG. 1, FIG. 2 also shows only by way of example a reproducing apparatus based on the use of a record carrier tape. If instead a record carrier disc is used, the devices 3'–13' can be dispensed with and would have to be replaced by conventional record disc operating means, so positioned that the record track on the record carrier disc is scanned by the beam B.

Summing up the operation of the recording apparatus according to the invention consists essentially in the production, on a record carrier member of insulating material, a sequential pattern of surface elements which are charged by means of an electron beam modulated by the signal to be recorded. Thereafter a finely divided material having characteristics of response to energy radiation impinging thereon different from the material of the record carrier, is applied thereto so that this finely divided material is held by static attraction on the surface elements carrying the above mentioned electric charge. Thereafter the excess material not held in this manner is removed and the remaining finely divided material on the charged surface elements is permanently attached in such position on the record carrier. Hereby a permanent record of electric signals is achieved.

The operation of a reproducing apparatus according to the invention consists in scanning the above mentioned pattern of sequential surface elements by means of a beam of a suitable type of radiating energy so as to cause in response thereto the emission of energy from the respective surface elements of the record carrier, while from the picked up emission of radiating energy an electrical signal is derived which corresponds to the signal which has been recorded on the record carrier.

It will be understood that each of the elements described above, or two or more together, may also find a useful application in other types of a method and apparatus for recording and reproducing, respectively, electrical signals differing from the types described above.

While the invention has been illustrated and described as embodied in a method and apparatus for recording and reproducing, respectively, electrical signals, the signals being recorded by the application of an electron beam modulated by the signal to be recorded and producing on the record carrier a sequential pattern of surface elements carrying an electrical charge of predetermined polarity, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of recording and subsequently reproducing electrical signals, comprising the steps of: producing on a record carrier member of insulating material comprising fluorescent material a sequential pattern of surface elements carrying an electrical charge and representing by their relative arrangement an electrical signal to be recorded, by directing a signal-modulated beam of electrons at said record carrier member while the latter is moved in a predetermined direction at a predetermined speed; applying to said record carrier member a finely divided light-absorbing material differing from said insulating material by being opaque to luminesence produced by said fluorescent material in response to a beam of light impinging thereon, so that said finely divided material is selectively held by attraction on said surface element carrying an electric charge; removing from said record carrier member that portion of said finely divided material which is not held thereon at said surface elements; permanently attaching to said record carrier member said finely divided material held thereon at said surface elements; scanning for reproduction said record carrier member by sequentially exposing said record carrier member to a beam of light; and deriving an output signal from energy pulses emitted by those portions of said record carrier member which are not shielded by said pattern of surface elements to which said finely divided material is attached, in response to said beam of light impinging thereon.

2. A method of recording and subsequently reproducing electrical signals, comprising the steps of: producing on a record carrier member of insulating material a sequential pattern of surface elements carrying an electrical charge and representing by their relative arrangement an electrical signal to be recorded, by directing a signal-modulated beam of electrons at said record carrier member while the latter is moved in a predetermined direction at a predetermined speed; applying to said record carrier member a finely powdered material having a predetermined coefficient of secondary electron emission differing from said insulating material by its capacity of responding to an electron beam impinging thereon by secondary electron emission, so that said finely powdered material is selectively held by attraction on said surface elements carrying an electric charge; removing from said carrier member that portion of said finely powdered material which is not held thereon at said surface elements; permanently attaching to said record carrier member said finely powdered material held thereon at said surface elements; scanning for reproduction said record carrier member by sequentially exposing said finely powdered material attached to said surface elements to a beam of electrons; and deriving an output signal from energy pulses emitted by said pattern of surface elements to which said finely powdered material is attached, in response to said beam of electrons impinging thereon.

3. A method of recording electrical signals, comprising the steps of: producing on a record carrier member of insulating material a sequential pattern of surface elements carrying an electrical charge and representing by their relative arrangement an electrical signal to be recorded; applying to said record carrier member a finely divided material differing from said insulating material by its capacity of responding to energy radiation impinging thereon by emitting corresponding amounts of energy, so that said finely divided material is selectively held by attraction on said surface elements carrying an electric charge; removing from said record carrier member that portion of said finely divided material which is not held thereon at said surface elements; and permanently attaching to said record carrier member said finely divided material held thereon at said surface elements by spraying an adhesive thereon.

4. A method of recording electrical signals, comprising the steps of: producing on a record carrier member of insulating material a sequential pattern of surface elements carrying an electrical charge and representing by their relative arrangement an electrical signal to be recorded, by directing a signal-modulated beam of electrons at said record carrier member while the latter is moved in a predetermined direction at a predetermined speed; applying to said record carrier member a finely powdered material having a predetermined coefficient of secondary electron emission differing from said insulating material by its capacity of responding to an electron beam impinging thereon by secondary electron emission, so that said finely divided material is selectively held by attraction on said surface elements carrying an electric charge; removing from said record carrier member that portion of said finely divided material which is not held thereon at said surface elements; and permanently attaching to said record carrier member said finely divided material held thereon at said surface elements.

5. A method of reproducing electrical signals from a record carrier comprising a sequential pattern of surface elements carrying, respectively, deposits of material differing from the carrier by its capacity of responding to energy radiation impinging thereon by emitting corresponding amounts of energy, the relative arrangement of said surface elements representing a recorded electrical signal, comprising the steps of: scanning for reproduction the record carrier member by sequentially exposing said material carried on said surface elements to a beam of energy radiation; and deriving an output signal from energy pulses emitted by said pattern of surface elements carrying said material, in response to said beam of energy radiation impinging thereon.

6. A method of reproducing electrical signals from a record carrier comprising a sequential pattern of surface elements carrying, respectively, deposits of material differing from the carrier by the latter's capacity of responding to energy radiation impinging thereon by emitting corresponding amounts of energy, and by said material deposits being opaque, the relative arrangement of said surface elements representing a recorded electrical signal, comprising the steps of: scanning for reproduction the record carrier member by sequentially exposing said material carried on said surface elements to a beam of light; and deriving an output signal from energy pulses emitted by said carrier where it is not shielded by said pattern of surface elements carrying said opaque material, in response to said beam of light impinging thereon.

7. An apparatus for recording electrical signals on a record carrier, comprising, in combination, an evacuable chamber; means for producing in said chamber a beam of charged particles having an intensity modulated by the signal to be recorded; means for moving the record carrier transversely of the direction of said beam for causing the latter to impinge thereon and to produce thereon a sequential pattern of surface elements carrying an electrical charge, said pattern representing the signal to be recorded; means for applying to the record carrier finely divided material so as to be held selectively by attraction on said surface elements carrying an electrical charge, said finely divided material differing from that of the record carrier by a difference in capacity of responding to energy radiation impinging thereon by emitting corresponding amounts of energy; means for removing from the recording carrier such amounts of said finely divided material which are not held thereon at said surface elements; and means for spraying an adhesive on the record carrier for permanently attaching to the record carrier those amounts of said finely divided material which are held thereon at said surface elements.

8. An apparatus for reproducing electrical signals recorded on a record carrier comprising a sequential pattern of surface elements carrying, respectively, deposits of material differing from the record carrier by a difference in capacity of responding to energy radiation impinging thereon by emitting corresponding amounts of energy, the relative arrangement of said surface elements representing a recorded electrical signal, comprising, in combination, means for producing a beam of energy radiation; means for moving the record carrier transversely of said beam for causing the latter to impinge thereon and for causing emission of energy from those portions of the record carrier which have the capacity of responding in this manner to said beam impinging thereon; and pickup means for receiving said emission of energy and for delivering an output signal corresponding to the recorded signal.

9. An apparatus for reproducing electrical signals recorded on a record carrier comprising a sequential pattern of surface elements carrying, respectively, deposits of material differing from the record carrier by a difference in capacity of responding to light impinging thereon by emitting corresponding amounts of energy, the relative arrangement of said surface elements representing a recorded electrical signal, comprising, in combination, means for producing a beam of light; means for moving the record carrier transversely of said beam for causing the latter to impinge thereon and for causing emission of light energy from those portions of the record carrier which have the capacity of responding in this manner to said beam impinging thereon; and photoelectric pickup means for receiving said emission of light energy and for delivering an output signal corresponding to the recorded signal.

References Cited in the file of this patent

UNITED STATES PATENTS

| | | |
|---|---|---|
| 2,716,048 | Young | Aug. 23, 1955 |
| 2,976,354 | Banning et al. | Mar. 21, 1961 |